(12) United States Patent
Kaikuranta (10) Patent No.: US 6,985,137 B2
(45) Date of Patent: Jan. 10, 2006

(54) METHOD FOR PREVENTING UNINTENDED TOUCH PAD INPUT DUE TO ACCIDENTAL TOUCHING

(75) Inventor: Terho Kaikuranta, Piispanristi (FI)

(73) Assignee: Nokia Mobile Phones Ltd., Espoo (FI)

( * ) Notice: Subject to any disclaimer, the term of this patent is extended or adjusted under 35 U.S.C. 154(b) by 395 days.

(21) Appl. No.: 09/928,929

(22) Filed: Aug. 13, 2001

(65) Prior Publication Data

US 2003/0034185 A1 Feb. 20, 2003

(51) Int. Cl.
G09G 5/00 (2006.01)

(52) U.S. Cl. .................................................. 345/175

(58) Field of Classification Search ............... 345/156, 345/158, 168, 169, 173, 175; 455/575, 566, 455/90.1, 572; 379/93.19, 428.01, 433.04; 178/18.03, 18.04, 18.05, 18.06, 18.09, 18.11
See application file for complete search history.

(56) References Cited

U.S. PATENT DOCUMENTS

| | | | |
|---|---|---|---|
| 5,666,037 A | 9/1997 | Reime | 318/483 |
| 5,715,524 A * | 2/1998 | Jambhekar et al. | 455/575.3 |
| 6,208,330 B1 * | 3/2001 | Hasegawa et al. | 345/173 |
| 6,415,138 B2 * | 7/2002 | Sirola et al. | 455/90.1 |
| 6,424,844 B1 * | 7/2002 | Lundqvist | 455/566 |
| 2002/0075243 A1 * | 6/2002 | Newton | 345/173 |
| 2002/0084992 A1 * | 7/2002 | Agnew | 345/173 |
| 2002/0160807 A1 * | 10/2002 | Robertson et al. | 455/556 |

FOREIGN PATENT DOCUMENTS

EP 0706648 1/1995

* cited by examiner

Primary Examiner—Chanh Nguyen
(74) Attorney, Agent, or Firm—Ware, Fressola, Van Der Sluys, Adolphson LLP (57) ABSTRACT

A method and system for preventing unintended touch pad input resulting from accidental touching of a touch pad device in an electronic device. A user can execute one or more touch pad functions by touching the touch pad device. The electronic device includes a key lock function to put the electronic device in a locked state such that only a limited number of selected input functions are available when the electronic device is in the locked state. When touch pad device is touched, a software program is used to determine whether the electronic device is the locked state and whether the touch function is one of the selected input functions in order to carry out or to block the touch pad function.

15 Claims, 7 Drawing Sheets

METHOD FOR PREVENTING UNINTENDED TOUCH PAD INPUT DUE TO ACCIDENTAL TOUCHING

CROSS REFERENCE TO RELATED APPLICATIONS

Reference is made to pending application U.S. patent application Ser. No. 09/928,967, filed Aug. 13, 2001 entitled METHOD AND DEVICE FOR DETECTING TOUCH PAD INPUT, assigned to the assignee of the present invention.

FIELD OF THE INVENTION

The present invention relates generally to a touch sensitive device in an electronic device or a wireless telecommunication terminal.

BACKGROUND OF THE INVENTION

A touch pad is usually defined as a touch-sensitive user interface area in an electronic device, which allows a user to input information or a command to the device by pressing the touch sensitive area. The touch pad can be used as a keypad having a designated functionality. For example, a touch pad can be used as an on/off switch and the user can turn the electronic device on or off by pressing the touch sensitive area. The touch pad can have several selectable functions. For example, the touch pad can be used as a keyboard having a plurality of soft-keys of different functions to allow the user to enter or select one function at a time.

In some touch pads, it is required to press the pad surface in order to deform it. In such a touch pad, several layers of material, separated by thin spacers, are used to form a grid of vertical and horizontal rows of electrodes. An electrical current is maintained in the grid of electrodes. When a user presses the pad, the layers are caused to make contact with each other at the pressing point, thereby interrupting the current in the electrode grid. A detection circuit is used to detect the interruption in the current and determine the location of the pressing point on the pad. In other touch pads, mere touching of the pad surface by a finger is sufficient. This latter type of touch pad can be of a resistive-type or capacitive-type. On a resistive-type touch pad, a thin, electrically conductive and resistive layer is coated on the surface of the touch surface area. On a capacitive-type touch pad, a coated layer having a matrix of pixel-like capacitors is provided on the touch sensitive area. When a finger touches the surface, it changes the electrical characteristics of the coated layer. By measuring the resistance or capacitance values at a number of surface points corresponding to the pressing point, the location of the pressing point can be determined. On an inductive-type touch pad, inductive elements are distributed over the touch pad area. A stylus made of an inductive material is used to change the signals transmitted through the inductive elements so that the presence of the style in the proximity of the touch pad can be detected.

Most touch pads can be damaged by having dirt or scratches on the touch sensitive surface. When such a touch pad is implemented on a portable electronic device, such as a mobile phone, the touch pad is usually mechanically protected by a flip, a slide or a cover. When a user wishes to use the touch pad to input information or select a function provided by the touch pad, the flip or cover must be flipped away to expose the touch pad surface to allow the user to touch the touch pad surface. When the electronic device is not in use, the flip or cover is usually flipped back to shield the touch pad surface. Not only does the flip or cover mechanically protect the touch pad surface, it also prevents unintended touching of the touch pad from occurring when the electronic device is put away in a pocket or accidentally dropped or touched. A flip on a mobile phone or similar electronic device usually includes a flip switch or flip mechanism, which can be used to turn on or off the power to the touch pad or the entire electronic device. Thus, when the touch pad is mechanically protected by the flip, the power to the touch pad is also turned off. Thus, even if the touch pad is accidentally touched, which is very unlikely, the touch pad is not functioning.

However, when a touch pad uses a number of optical sensing components, such as light emitters and receivers, to detect the presence of a touching object at the touch pad surface, and the touch pad is designed such that dirt or scratches do not noticeably affect such detection, there is no need to provide a flip or cover on the electronic device to shield the touch pad from mechanical damage when the electronic device is not in use. As the touch pad is exposed to touching regardless of whether the electronic device is in use, accidental touching of the touch pad may have unexpected and sometimes unpleasant consequences.

In some mobile phones, a key lock feature is provided so that the phone can be put in a locked state when the user has no plan to use the phone for a while. When the phone is in a locked state, most of the keypad entries are disabled, but some of the phone functions remain active. For example, the user cannot make a phone call, but the phone can still monitor incoming calls and alert the user to such calls. In some phones, the key lock can be activated by selecting the MENU function followed by the * function to order to put the phone in the locked state. By selecting similar functions, the key lock can be de-activated to "unlock" the phone. If a touch pad device is part of a text/message display of a mobile phone, for example, it is preferred that the display remains functioning even when the phone is in the locked state. This means that the power to the display and, therefore, the touch pad is not turned off. As such, the display can still be used to display text/messages to the user when the phone is in the locked state. Furthermore, a number of selected touch pad functions may still be carried out, but all the non-selected touch pad functions are not carried out after the key lock is activated.

It is advantageous and desirable to provide a method and system for preventing unintended touch pad input resulting from accidental touching, so that the "unavailable" touch pad functions will not be carried out when the phone is the locked state.

SUMMARY OF THE INVENTION

It is the primary objective of the present invention to prevent unintended touch pad input resulting from accidental touching of the touch pad once the key lock feature is selected to put the electronic device in a locked state. This objective can be accomplished by using a software program in the electronic device to determine whether the touching is accidental and whether the touch pad input function is allowed to be carried out even when the electronic device is in the locked state.

According to the first aspect of the present invention, a method of preventing unintended touch pad input resulting from accidental touching of a touch pad device in an electronic device, said electronic device including a key lock function settable in a first state allowing a user to input into the electronic device one of a plurality of input functions, and settable in a second state allowing the user to input into the electronic device one of a number of selected ones of said plurality of input functions, wherein said touch pad device allows the user to execute a touch-pad function by placing an object at the touch pad device, thereby providing a touch signal for achieving a touch pad input indicative of the touch-pad function, and wherein the touch pad device comprises a plurality of optical sensor components including at least two light emitters and one light receiver to detect the presence of the object at the touch pad device, and wherein the optical sensor components are disposed in or near the touch pad device such that the light receiver is capable of receiving light emitted from the light emitters for providing an output signal, and wherein the output signal is caused to change when the object is present, said method comprising the steps of:

detecting the change in the output signal, for providing the touch signal when the object is present;

determining, in response to the touch signal, whether the key lock function is in the first state or in the second state; and if the key lock function is the first state, or if the key lock function is in the second state and the touch pad function is one of said selected functions, providing the touch pad input indicative of the touch pad function.

According to the present invention, there can be one or more touch-pad functions for the user to select.

According to the present invention, the number of the selected functions allowed to be carried out, even if the key lock function is set in the second state, can be one or more. However, it is possible that the number of selected functions is zero. In the latter case, it is preferred that the power to the touch pad device be switched off by software when the key lock function is set in the second state to conserve power.

According to the present invention, the providing step and/or the determining step are carried out by a software program.

According to the second aspect of the present invention, an electronic device having a touch pad device for allowing a user to execute a touch-pad function by placing an object in or near the touch pad device, thereby providing a touch signal for achieving a touch pad input indicative of the touch pad function, wherein the touch pad device comprises a plurality of optical sensor components including at least two light emitters and one light receiver to detect the presence of the object, and wherein the optical sensor components are disposed in or near the touch pad device such that the light receiver is capable of receiving light emitted from the light emitters for providing an output signal, and wherein the output signal is caused to change when the object is present, said electronic device comprising:

a key lock function settable in a first state to allow a user to input into the electronic device one of a plurality of input functions and settable in a second state to allow the user to input into the electronic device one of a number of selected ones of said plurality of input functions;

a mechanism for detecting the change in the output signal and providing the touch signal when the object is present;

a mechanism, responsive to the touch signal, for determining whether the key lock function is in the first state or in the second state for providing a state signal indicative of the state of the key lock function; and a mechanism, responsive to the state signal, for providing the touch pad input indicative of the touch pad function if the key lock function is in the first state, or if the key lock function is in the second state and the touch pad function is one of said selected functions.

According to the present invention, the mechanism for providing touch pad input has a software program to determine whether the touch pad input is provided.

According to the present invention, the mechanism for determining the key lock state has a software program for such determining.

The present invention will become apparent upon reading the description taking in conjunction with FIGS. 1 to 5.

DETAILED DESCRIPTION OF THE INVENTION

Figure 1:
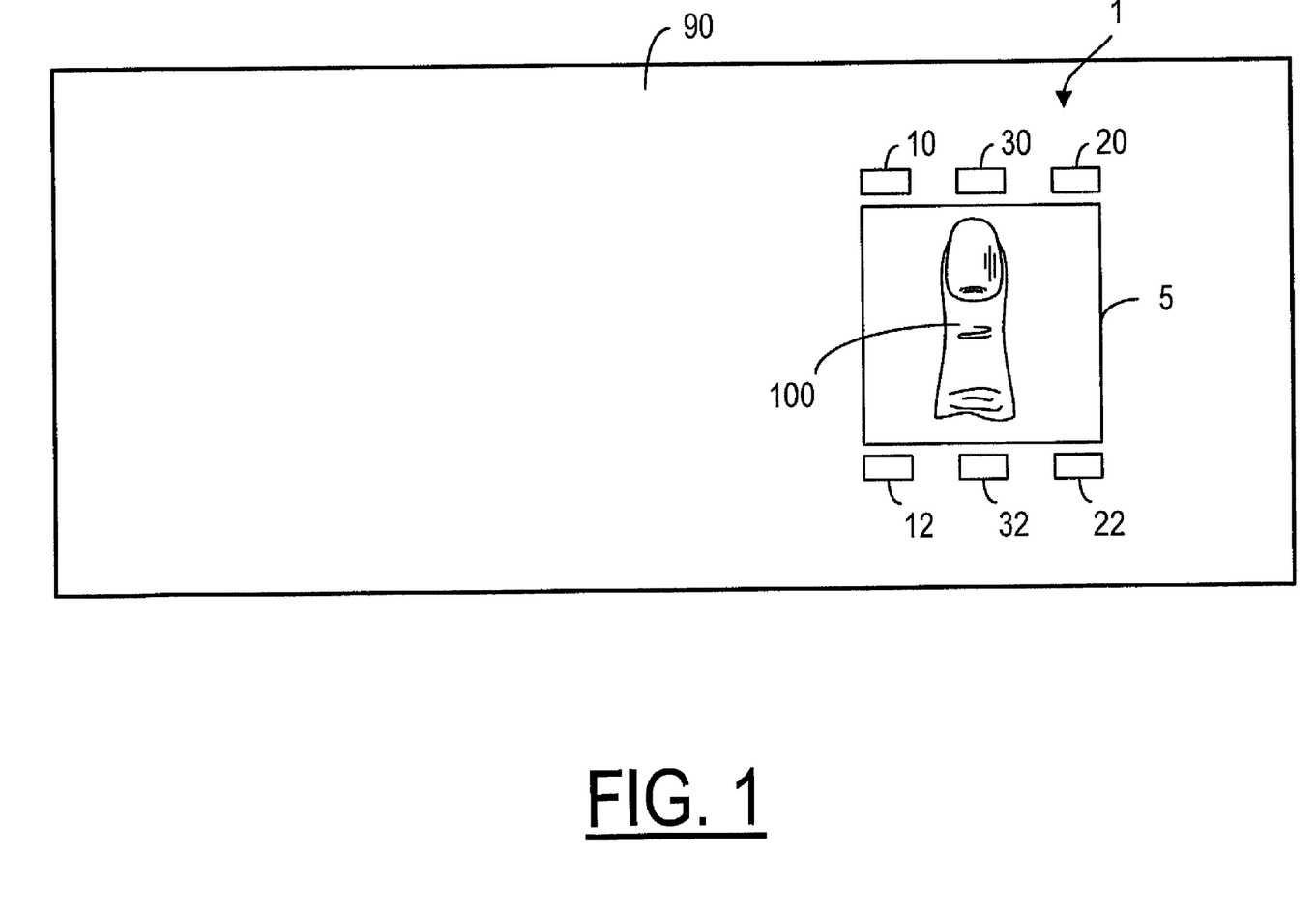
FIG. 1 is a diagrammatic representation of an exemplary touch pad device using a plurality of optical sensor components positioned near the top side and bottom side of the touch pad area to detect the presence of a touching object.
Figure 2A:
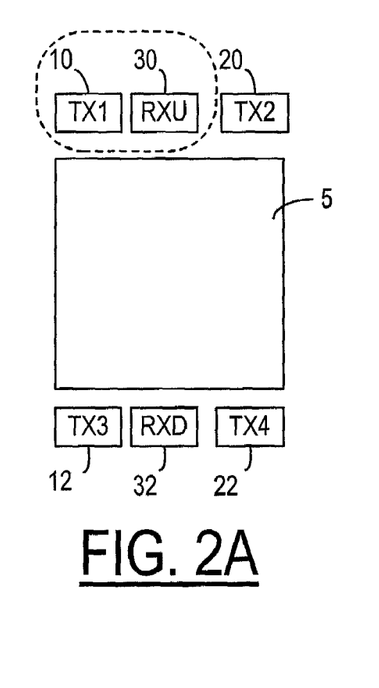
FIG. 2A is a diagrammatic representation showing a touch pad device of FIG. 1, wherein one emitter and the receiver near the top side are used for measurement.
Figure 2B:
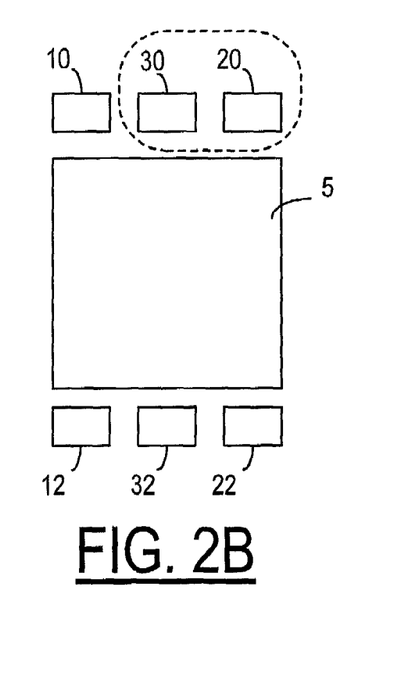
FIG. 2B is a diagrammatic representation showing a touch pad device of FIG. 1, wherein another emitter and the receiver near the top side are used for measurement.
Figure 2C:
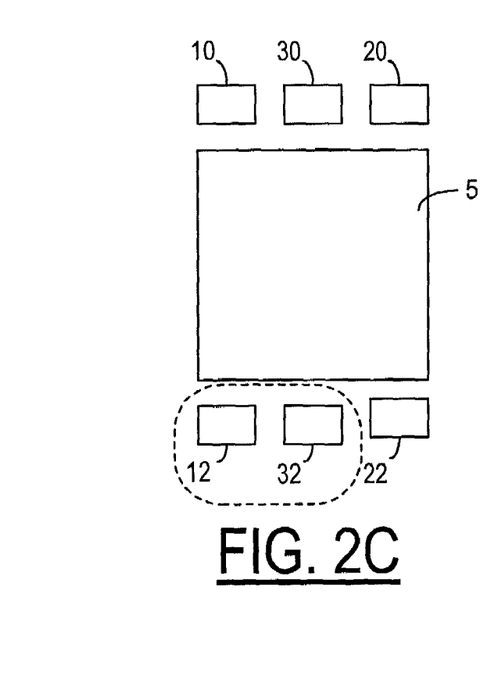
FIG. 2C is a diagrammatic representation showing a touch pad device of FIG. 1, wherein one emitter and the receiver near the bottom side are used for measurement.
Figure 2D:
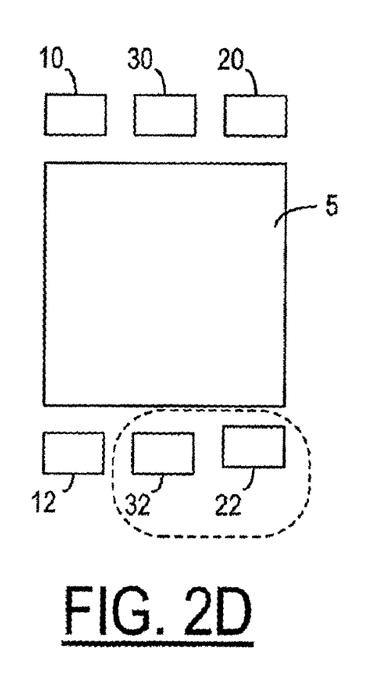
FIG. 2D is a diagrammatic representation showing a touch pad device of FIG. 1, wherein another emitter and the receiver near the bottom side are used for measurement.
Figure 2E:
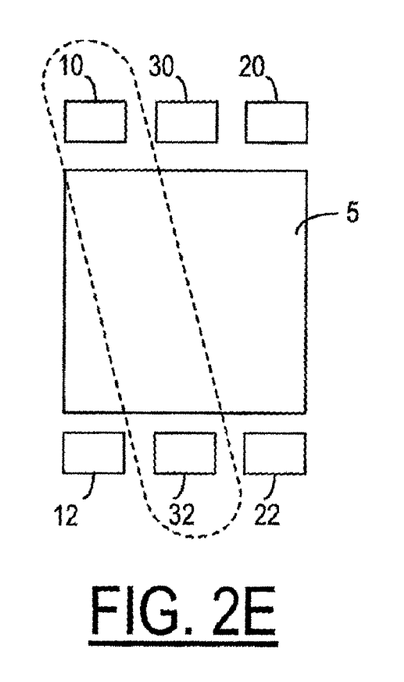
FIG. 2E is a diagrammatic representation showing the touch pad device of FIG. 1, wherein one emitter near the top side and the receiver near the bottom side are used for measurement.
Figure 2F:
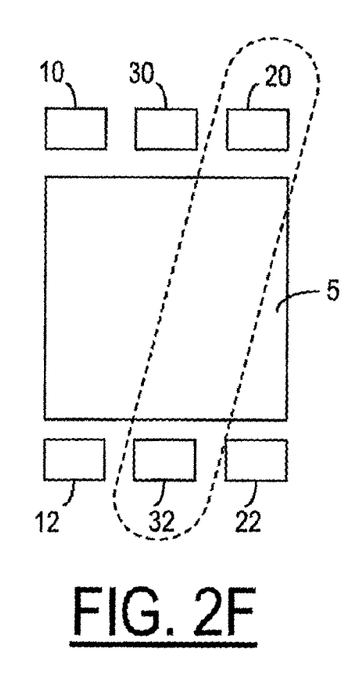
FIG. 2F is a diagrammatic representation showing a touch pad device of FIG. 1, wherein another emitter near top side and the receiver near the bottom side are used for measurement.
Figure 2G:
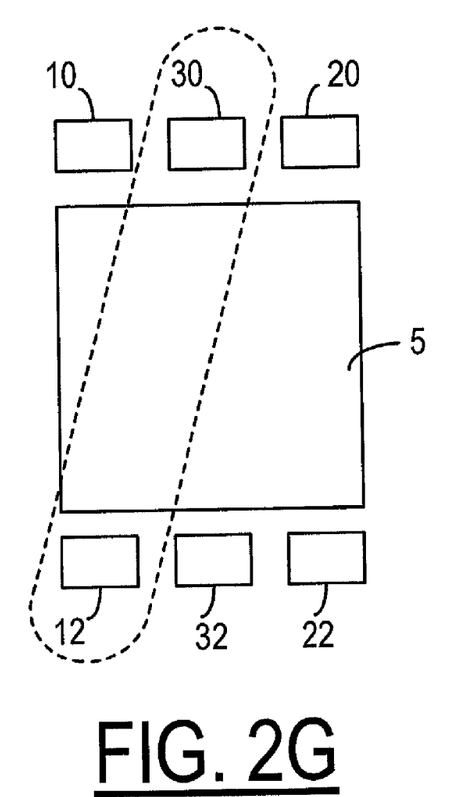
FIG. 2G is a diagrammatic representation showing a touch pad device of FIG. 1, wherein one emitter near the bottom side and the receiver near the top side are used for measurement.
Figure 2H:
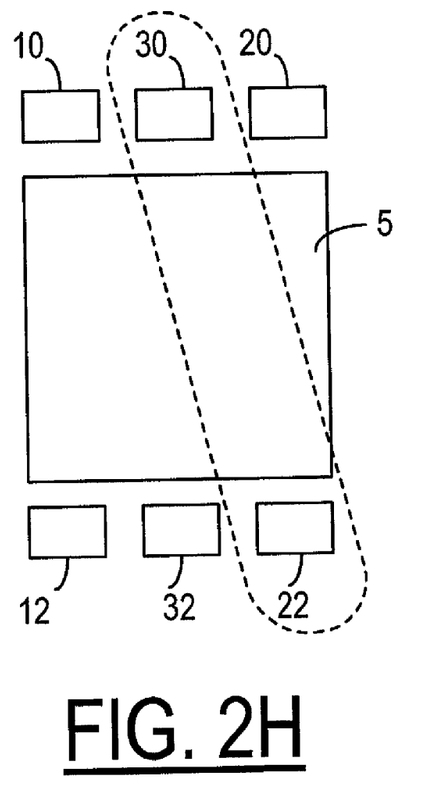
FIG. 2H is a diagrammatic representation showing the touch pad device of FIG. 1, wherein another emitter near the bottom side and the receiver near the top side are used for measurement.

FIG. 1 shows a typical touch pad device 1 mounted on a printed circuit board (PCB) or a printed wire board (PWB) 90. The touch pad device 1 includes a touch pad area 5 and a plurality of optical sensor components positioned around the touch pad area 5. As shown in FIG. 1, the optical sensor components include light emitters 10, 12, 30 and 32, and light receivers 30 and 32. The receiver 30 is capable of receiving light emitted by the emitters 10 and 20, and the receiver 32 is capable of receiving light emitted by the emitters 12 and 22. When a user uses an object, such as the user's finger 100, to touch the touch pad area 5, light emitted by the emitters 10 and 20 encounters the touching object 100 and reflect off the touching object 100 to the receiver 30, thereby causing a change in the output 130 (FIG. 3) of the receiver 30. Likewise, light emitted by the emitters 12 and 22 encounters the touching object 100 and reflects off the touching object to the receiver 32, causing a change in the output 132 (FIG. 3) of the receiver 32. The changes in the receiver output can be used to detect the presence of the touching object 100, as well as the location of the touching point within the touch pad area 5. It should be noted that the touch pad device 1 can be used for executing a single touch pad function, or it can be used for executing a plurality of touch pad functions based on the location of the touching point. In order to determine the location of the touching point, it is preferable to carry out a series of eight measurement cycles, as shown in FIGS. 2A–2H and TABLE I. In each measurement cycle, only one emitter and one receiver are used for measurement—the used emitter and receiver in the measurement are in a dashed loop. For example, in the first measurement cycle, the emitter 10 and the receiver 30, as shown in FIG. 2A, are used to measure the change in the output 130 attributable to the emitter 10. The emitters 12, 20, 22 and the receiver 32 are turned off or disabled. As shown in FIG. 2B, the emitter 20 and the receiver 30 are used for the second measurement cycle. The measurement results from the first measurement cycle and the second measurement cycle are compared in order to determine the horizontal location of the touching point. Additionally, the measurement result from the emitter 12/receiver 32 pair (FIG. 2C) is compared to the measurement result from the emitter 22/receiver 32 pair (FIG. 2D) to further determine the horizontal location of the touching point. From these four measurements (FIGS. 2A–2D), it is possible to calculate the two-dimensional coordinates of the touching point. However, in order to improve the accuracy in location determination, it is preferable to also carry out the following measurements: the emitter 10/receiver 32 pair (FIG. 2E); the emitter 20/receiver 32 pair (FIG. 2F); the emitter 12/receiver 30 pair (FIG. 2G) and the emitter 22/receiver 30 pair (FIG. 2H). The series of eight measurements are summarized in TABLE I, where TX1=emitter 10, TX2= emitter 20, TX3=emitter 12, TX4=emitter 22, RXU=receiver 30 and RXD=receiver 32.

TABLE I

| | TX1 | RXU | TX2 | TX3 | RXD | TX4 | measured direction |
|---|---|---|---|---|---|---|---|
| 1 | on  | on  | off | off | off | off | horizontal, upper |
| 2 | off | on  | on  | off | off | off | horizontal, upper |
| 3 | off | off | off | on  | on  | off | horizontal, lower |
| 4 | off | off | off | off | on  | on  | horizontal, lower |
| 5 | off | on  | off | on  | off | off | diagonal/ |
| 6 | off | off | on  | off | on  | off | diagonal/ |
| 7 | on  | off | off | off | on  | off | diagonal\ |
| 8 | off | on  | off | off | off | on  | diagonal\ |

Figure 3:
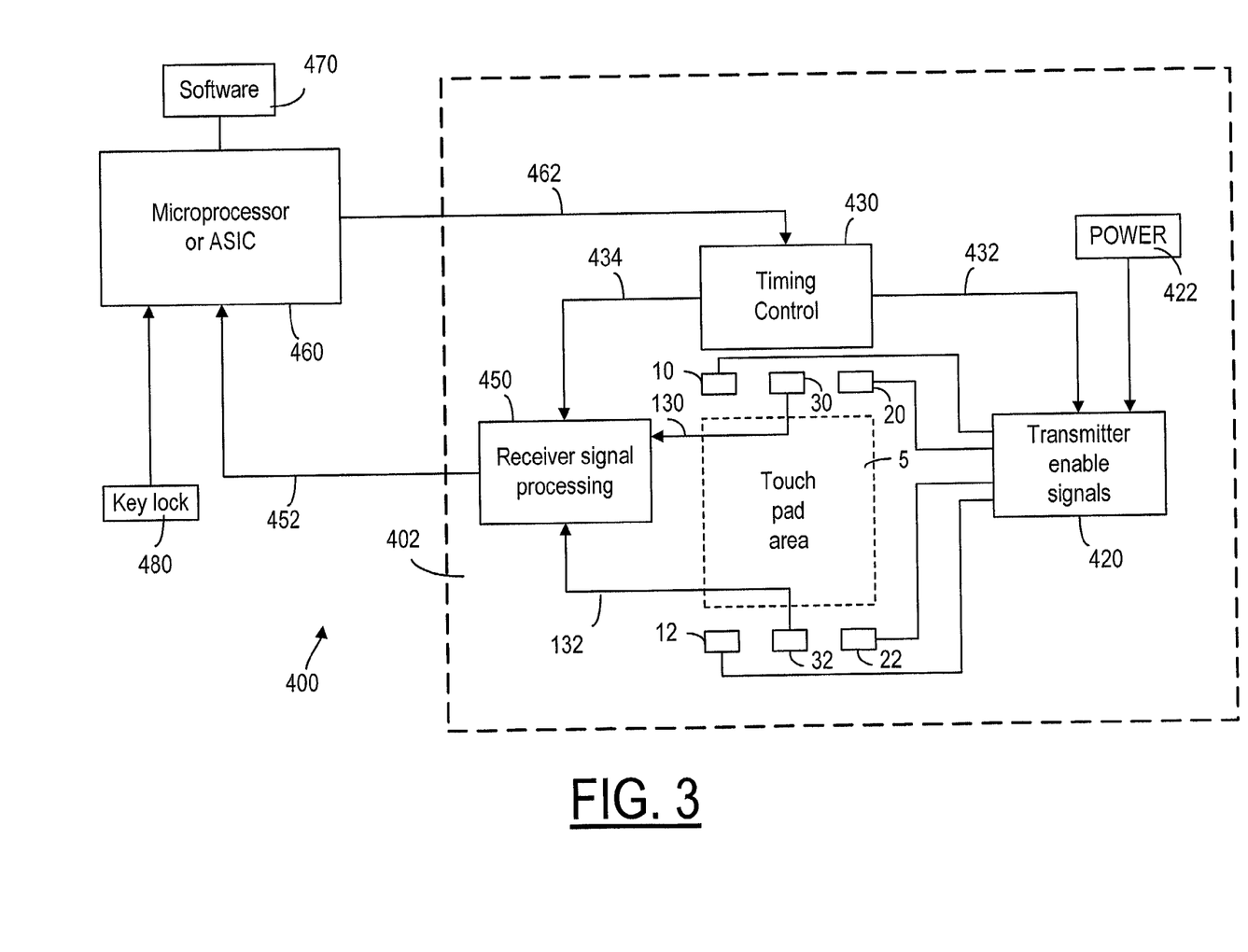
FIG. 3 is a block diagram showing the basic components in a system for detecting the presence of a touching object at the touch pad device.

FIG. 3 is a block diagram showing the basic electronic components in a system for detecting the presence of the touching object 100 and determining the location of the touching point on the touch pad area 5. The same system can also be used to prevent unintended touch pad input resulting from accidental touching of the touch pad device 1. The electronic system 400 can be used in virtually all electronic devices, such as mobile phones, personal data assistant devices and the like. In a mobile phone, a key lock feature is usually provided so that the phone can be put in a locked state when the user has no plan to use the phone for a period. A mobile phone, like many other electronic devices, contains a large amount of software therein to run a variety of tasks. For example, some software programs are used to carry out basic signal processing and interpretation, some are used to generate a phone book, calendar, clock or short message, and some are used to take care of user interface (UI) functionality. According to the present invention, software can be used to determine the location of the touching point on the touch pad device. Software can also be used to prevent unintended touch pad input due to accidental touching of the touch pad device when the key lock feature is in the activated state.

Figure 4:
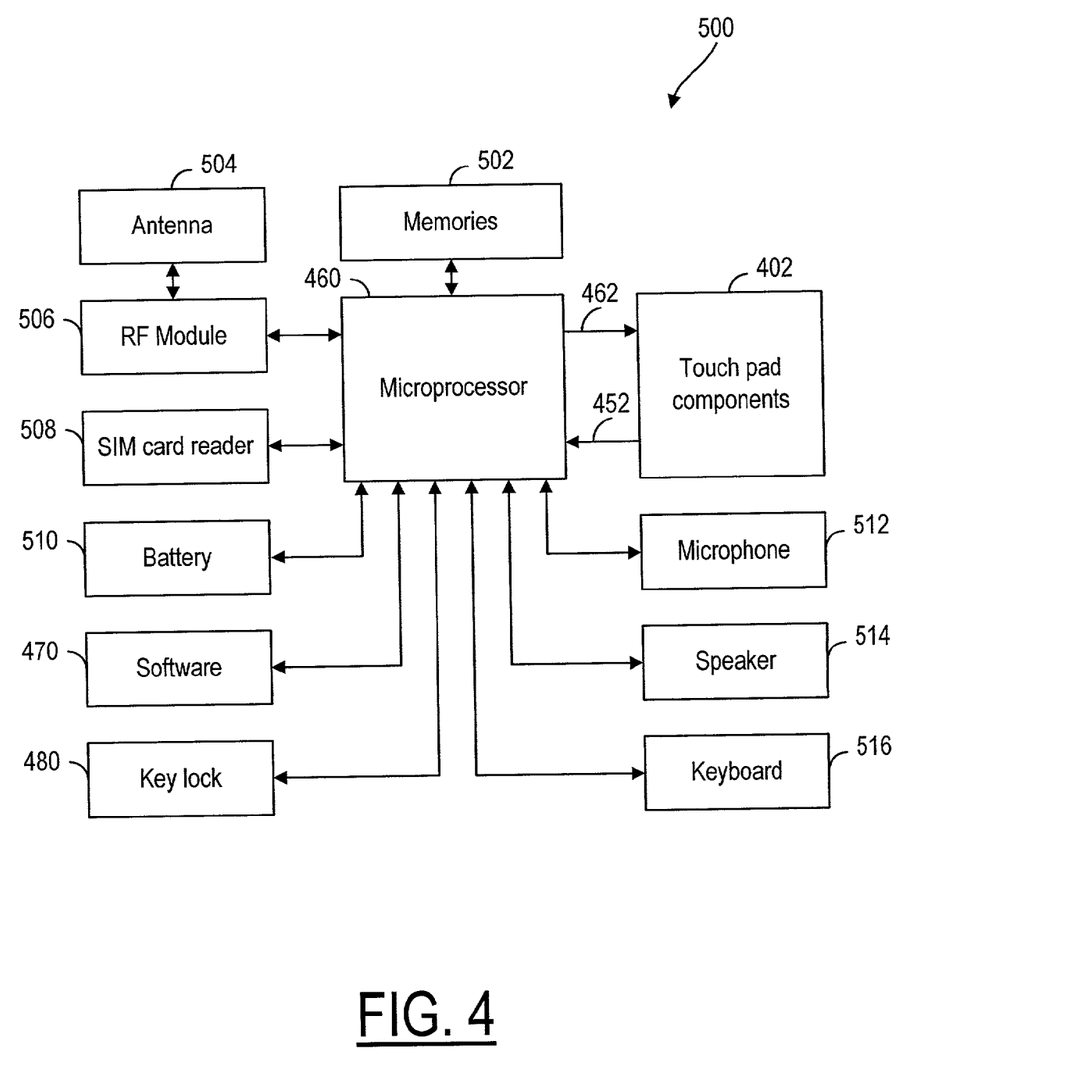
FIG. 4 is a block diagram showing a portable electronic device having a touch pad for executing touch pad input.

The software, denoted by reference numeral 470, is linked to a microprocessor 460 in the electronic system 400, as shown in FIG. 3. The system 400 can be part of a mobile phone, as described above and shown in FIG. 4. The system 400 comprises a microprocessor 460 linked to basic components 402. If the system 400 is used in a mobile phone, the touch pad area 5 can be a top surface of a display in the mobile phone, for example. However, the touch pad device can be used outside the display. As shown in FIG. 4, the touch pad device includes a touch pad area 5 with two groups of sensor components separately placed at the top side and the bottom side of the touch pad area 5, similar to FIGS. 1–2H. The emitters 10, 12, 20, 22 are connected to an enabling module 420, which selectively enables or disables the emitters for measurements. The output signal 130 from the receiver 30 and the output signal 132 from the receiver 32 are conveyed to a signal-processing module 450. The enabling module 420 and the signal-processing module 450 are under the control of a timing control module 430. For example, in order to make the measurement cycle 5 as shown in TABLE I or FIG. 5E, the timing control module sends out a control signal 432 to the enabling module 420 for turning off or disabling the emitters 12, 20, 22 and enabling the emitter 10. At the same time, the timing control module 430 sends out a control signal 434 to the signal processing module 450 such that only the output signal 132 from the receiver 32 is used. Based on the output signal 132, the signal processing module 450 sends measurement information 452 to the microprocessor 460. After receiving the measurement information 452, the microprocessor 460 sends out a command signal 462 to the timing control 430 for starting the measurement of the next cycle. After all eight measurement cycles are completed, the microprocessor 460 determines the location of the touching point using the software 470. The microprocessor 460 interprets the touch pad function corresponding to the touching point in order to carry out the input function. As shown, a key lock switch 480 is operatively connected to the microprocessor 460. If the key lock switch 480 is activated to put the electronic device in a locked state, the input function is not carried out. It should be noted that the key lock switch 480 can be a single hardware switch. However, in general, the key lock switch 480 represents a logical expression for different means that can invoke the key lock function. For example, one can combine different keypad functions to put the electronic device in the locked state—pushing two or more keys in the keypad simultaneously or sequentially. There are a number of ways in which the software 470 inhibits the input function of the touch pad to be carried out if the electronic device is in the locked state. For example, the software 470 can be used to turn off the power 422 to the enabling module 420, to prevent the enabling module 420 from enabling the emitters 10, 12, 20, and 22, to block the signals 130 and 132 from being processed by the signal processing module 450, or to ignore the measurement information 452. However, it is preferred that the software 470 allows the measurement information 452 to be conveyed to the microprocessor 460, and the microprocessor 460 interprets the touch pad function based on the measurement information 452 even when the electronic device is in the locked state. Whether or not the touch pad function is carried out will be determined by the software 470, as described at step 660 in the flow-chart of FIG. 5.

FIG. 4 shows a portable electronic device, such as a mobile phone 500 that includes a touch pad device of the present invention. As shown, the mobile phone 500 includes the microprocessor 460, the software 470, the key lock switch 480 and the basic components 402, as shown in FIG. 3. In addition, the mobile phone 500 comprises an antenna 504 connected to an RF module 506 for receiving and transmitting RF signals; a battery 508, a microphone 512, a speaker 514 and a keyboard 516. Also, the mobile phone 500 may have a SIM card reader 508 and other electronic devices. The additional components shown in FIG. 4 are known in the art and not part of the present invention. FIG. 4 is used to illustrate how a touch pad device can be used on an electronic device such as a mobile phone.

Figure 5:
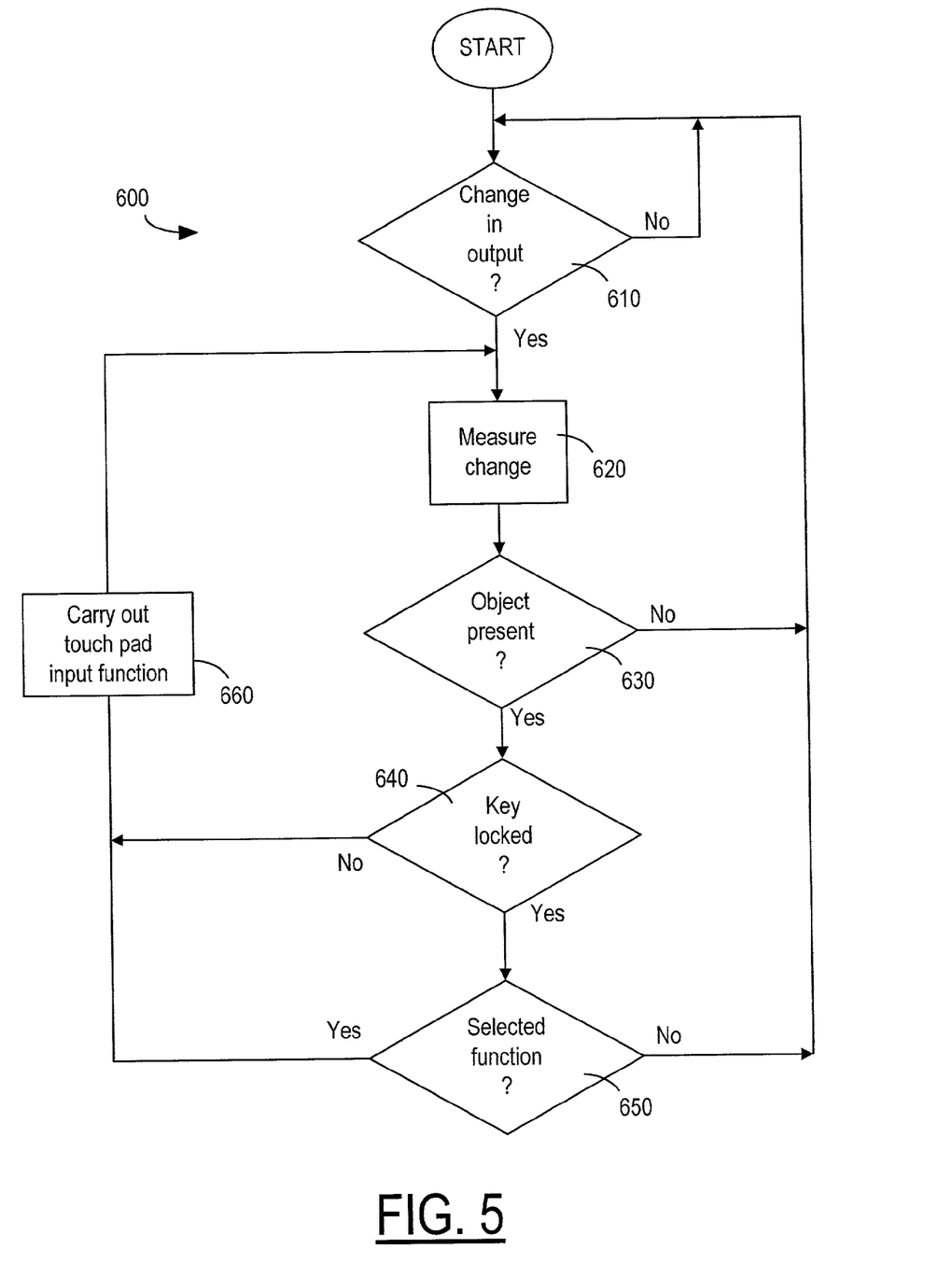
FIG. 5 is a flow-chart illustrating the method of preventing unintended touch pad input due to accidental touching, according to the present invention.

The method of preventing unintended touch pad input resulting from accidental touching of the touch pad device 1, can be illustrated using the flow-chart 600 shown in FIG. 5. As shown, when a change in the output 130 (FIG. 3) of the receiver 30 and/or the output 132 of the receiver 32 is detected at step 610, the change is measured at step 620 in order to determine whether a touching object is present at the touch pad area 5. If it is determined at step 630 that a touching object is not present and the change in the receivers is due to dirt or wetness on the touch pad area, the change will be ignored until the next change is detected. If it is determined that a touching object is present, it is further determined at step 640 whether the key lock is activated. If the key lock is not activated, the microprocessor 460, based on the software 470, determines the location of the touching point on the touch pad area 5, interprets the touch pad function based on the touching point and carries out the touch pad function at step 660. If the key lock is activated, then the touching may be accidental and not intentional. However, it is possible to allow a number of selected touch-pad functions to be carried out even if the key lock is activated. In that case, only the non-selected touch-pad functions are prevented from being carried out. At step 650, the microprocessor 460, based on the software 470, determines whether the touching is corresponding to one of the selected touch-pad functions. If it is, then the touch-pad function is carried out at step 660. Otherwise, the touching can be ignored. After the touch pad function is carried out at step 660, the change in the receiver output is repeatedly measured in order to track the movement of the touching object until the touching is over. There can be a number of such selected functions. For example, if the touch pad device 1 is used in the mobile phone 500, as shown in FIG. 4, the touch pad device 1 can be used to make an emergency call even when the key lock function has been activated to put the mobile phone in the locked state. Likewise, the touch pad device 1 can also be used to accept a non-collect call, or a call from a selected list of callers.

For a mobile phone that does not have such selected functions, step 650 will be omitted from the flow-chart 600 and the process is looped back to 610 if it is determined at step 640 that the key lock is activated. Furthermore, if the mobile phone does not have such selected functions, it is preferred that the software 470 switches off the power 470 to some or all hardware components in the basic components 402 (FIG. 3) when the key lock is activated in order to conserve power. For example, the software 470 can disable the power supply to the optical sensor components 10, 12, 20, 22, 30, and 32. The power supply to the power-off components can be resumed when the key lock is deactivated.

The present invention provides a method and system for using software, instead of hardware, to prevent unintended touch pad input resulting from accident touching of the touch pad device in a mobile phone. The same method and system can be used in other electronic devices, such as a personal data assistant (PDA), a communicator or the like. The touch pad device can have two or more light emitters and one or more light receivers. These emitters and receivers can be disposed inside or outside the touch pad area. It is preferred that the emitters are operated in a pulsed mode, as disclosed in the pending application Ser. No. 09/928,967, entitled METHOD AND DEVICE FOR DETECTING TOUCHPAD INPUT, which is hereby incorporated by reference to the extent necessary to understand the present invention.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of preventing unintended touch pad input resulting from accidental touching of a touch pad device in an electronic device by an external object when the touch pad device is exposed, said electronic device including a key lock function settable in a first state allowing a user to input into the electronic device one of a plurality of input functions, and settable in a second state allowing the user to input into the electronic device one of a number of selected ones of said plurality of input functions, wherein said touch pad device allows the user to execute a touch-pad function by placing the object at the touch pad device, thereby providing a touch signal for achieving a touch pad input indicative of the touch-pad function, and wherein the touch pad device comprises:

a touch pad area having a first side and an opposing second side;

a first set of optical sensor components disposed along the first side of the touch pad area; and a second set of optical sensor components disposed along the second side of the touch pad area, each of the first and second sets of optical sensor components including at least two light emitters and one light receiver disposed substantially between the two light emitters to detect the presence of the object at the touch pad device, each of the light emitters located at a location different from other ones of the light emitters and also different from the light receivers, the light emitters emitting light only when activated, such that the light receiver is capable of receiving light emitted from the activated light emitters and reflected by the object for providing an output signal, and wherein the output signal is caused to change due to an increased amount of light received in the light receiver when the object is present, said method comprising the steps of:

detecting the change in the output signal for providing the touch signal when the object is present;

determining, in response to the touch signal, whether the key lock function is in the first state or in the second state when the touch area is exposed to the external object; and if the key lock function is the first state, or if the key lock function is in the second state and the touch pad function is one of said selected input functions, providing the touch pad input indicative of the touch pad function.

2. The method of claim 1, wherein the providing step is carried out by a software.

3. The method of claim 1, wherein the determining and the providing steps are carried out by a software.

4. The method of claim 1, wherein the touch pad device allows the user to choose one of a plurality of touch pad functions based on the location of the object present at the touch pad device, said method further comprising the step of determining the chosen touch pad function based on the change in the output signal, wherein the touch signal is indicative of the chosen touch pad function.

5. The method of claim 1, wherein the number of the selected input functions includes zero.

6. The method of claim 1, wherein said detecting step is carried out in a number of measurements by selectively activating one or more light emitters such that at least one activated light emitter in one measurement is different from at least one activated light emitter in another measurement.

7. A method of preventing unintended touch pad input resulting from accidental touching of a touch pad device in an electronic device by an external object when the touch pad device is exposed, said electronic device including a key lock function settable in a first state allowing a user to input into the electronic device one of a plurality of input functions, and settable in a second state allowing the user to input into the electronic device one of a number of selected ones of said plurality of input functions, wherein said touch pad device allows the user to execute a touch-pad function by placing the object at the touch pad device, thereby providing a touch signal for achieving a touch pad input indicative of the touch-pad function, and wherein the touch pad device comprises:

a touch pad area having a first side and an opposing second side;

a first set of optical sensor components disposed along the first side of the touch pad area; and a second set of optical sensor components disposed along the second side of the touch pad area, each of the first and second sets of optical sensor components including at least two light emitters and one light receiver disposed substantially between the two light emitters to detect the presence of the object at the touch pad device, each of the light emitters located at a location different form other ones of the light emitters and also different from the light receivers, the light emitters emitting light only when activated, such that the light receiver is capable of receiving light emitted from the activated light emitters and reflected by the object for providing an output signal, and wherein the output signal is caused to change due to an increased amount of light received in the light receiver when the object is present, said method comprising the steps of:

detecting the change in the output signal for providing the touch signal when the object is present;

determining, in response to the touch signal, whether the key lock function is in the first state or in the second state when the touch area is exposed to the external object; and providing the touch pad input indicative of the touch pad function only if the key lock function is the first state.

8. The method of claim 7, further comprising the step of powering off the optical sensor components when the key lock function is in the second state.

9. The method of claim 8, wherein the powering off step is carried out by a software.

10. The method of claim 7, wherein the optical sensor components are controlled by one or more controlling devices, and wherein the optical sensor components and the controlling devices are powered by a power source, said method further comprising the step of turning off the power source to the optical sensor components and the controlling devices by a software for conserving the power source.

11. The method of claim 7, wherein said detecting step is carried out in a number of measurements by selectively activating one or more light emitters such that at least one activated light emitter in one measurement is different from least activated light emitter in another measurement.

12. An electronic device having a touch pad device for allowing a user to execute a touch-pad function by placing an external object in or near the touch pad device when the touch pad device is exposed to the external object, thereby providing a touch signal for achieving a touch pad input indicative of the touch pad function, wherein the touch pad device comprises:

a touch pad area having a first side and an opposing second side;

a first set of optical sensor components disposed along the first side of the touch pad area; and a second set of optical sensor components disposed along the second side of the touch pad area, each of the first and second sets of optical sensor components including at least two light emitters and one light receiver disposed substantially between the two light emitters to detect the presence of the object at the touch pad device, each of the light emitters located at a location different from other ones of the light emitters and also different from the light receivers, the light emitters emitting light only when activated, such that the light receiver is capable of receiving light emitted from the light emitters and reflected by the object for providing an output signal, and wherein the output signal is caused to change due to an increased amount of light received in the light receiver when the object is present, said electronic device comprising:

a key lock function settable in a first state to allow a user to input into the electronic device one of a plurality of input functions when the touch pad area is exposed to the external object and settable in a second state to allow the user to input into the electronic device one of a number of selected ones of said plurality of input functions when the touch pad area is exposed to the external object;

means, for detecting the change in the output signal for providing the touch signal when the object is present;

means, responsive to the touch signal, for determining whether the key lock function is in the first state or in the second state for providing a state signal indicative of the state of the key lock function; and means, responsive to the state signal, for providing the touch pad input indicative of the touch pad function if the key lock function is in the first state, or if the key lock function is in the second state and the touch pad function is one of said selected functions.

13. The electronic device of claim 12, wherein the determining means includes a software program for determining the key lock state.

14. The electronic device of claim 12, wherein the providing means includes a software program for carrying out the touch pad input.

15. The electronic device of claim 12, wherein the detecting means detects the change in the output signal in a number of measurements by selectively activating one or more light emitters such that at least one activated light emitter in one measurement is different from at least one activated light emitter in another measurement.

* * * * *

UNITED STATES PATENT AND TRADEMARK OFFICE
CERTIFICATE OF CORRECTION

PATENT NO. : 6,985,137 B2  Page 1 of 1
DATED : January 10, 2006
INVENTOR(S) : Terho Kaikuranta It is certified that error appears in the above-identified patent and that said Letters Patent is hereby corrected as shown below:

<u>Column 10,</u>
Line 23, before "least" insert -- at --.
Line 23, before "activated" insert -- one --.

Signed and Sealed this

Fourth Day of April, 2006

JON W. DUDAS
*Director of the United States Patent and Trademark Office*